Sept. 26, 1933.  P. H. A. VAN LIS  1,928,401
DIRECT CURRENT EXCITATION OF SYNCHRONOUS MOTORS
Filed Oct. 5, 1928
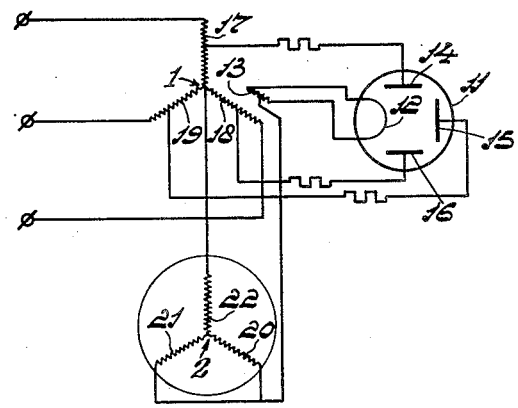
Inventor:-
P. H. A. van Lis, Patented Sept. 26, 1933

1,928,401

UNITED STATES PATENT OFFICE 1,928,401

DIRECT CURRENT EXCITATION OF SYNCHRONOUS MOTORS

Pieter Hendrik Abraham van Lis, Eindhoven, Netherlands, assignor to N. V. Philips' Gloeilampenfabrieken, Eindhoven, Netherlands, a limited liability company Application October 5, 1928, Serial No. 310,529, and in the Netherlands November 3, 1927

3 Claims. (Cl. 172—280)

This invention is concerned with synchronized asynchronous motors and more particularly with means to supply the rotors of these motors with direct current.

The invention has for its object to improve the cos. $\phi$ in an alternating current network by means of the said motors, which operate as synchronous machines.

It has long been known to improve the power factor of electric supply systems by the use of over-excited synchronous motors which create leading currents in the system. Such synchronous motors are widely used especially in electric power supply systems to which large induction motors are connected, so as to compensate for the lagging currents created by the same.

The method of synchronizing an asynchronous motor was firstly indicated by Daniëlson. In this case the machine is started as an asynchronous motor and after the synchronous number of revolutions is almost reached, the motor is excited with direct current.

For this direct current excitation a separate exciting dynamo or a battery have been used as a rule. As the rotor winding of an asynchronous motor has always a comparatively low direct current resistance, the exciting dynamo should be capable of supplying a high current strength at a low tension; it must therefore be provided with a large commutator which renders the construction expensive.

It has, however, been found that a gasfilled incandescent cathode rectifier is particularly adapted to supply such currents, and according to the invention, a gasfilled thermionic device is used to supply the rotor of a synchronized asynchronous motor with rectified alternating current. For this purpose the stator winding of the asynchronous motor is provided with taps adapted to supply a low alternating voltage to the rectifier tube. The rectifier tube is connected in series with the rotor and stator windings whereby the rotor winding is supplied with a voltage exciting current also passing through the stator winding. The motor is thereby running as a synchronous motor after it has attained its synchronous speed. The heating current for the cathode of the rectifier is supplied from a winding coupled with the stator winding.

The invention will be more clearly understood by reference to the accompanying diagrammatic drawing in which:

The single figure is a diagram showing one embodiment of my invention in which a 3-phase rectifier is supplied with low voltage alternating current from the stator winding of the motor, and the rectifier supplies the direct current to the rotor of the motor.

The stator winding 1 comprises three phases connected in star, the free ends of the windings being connected to the alternating current supply. The rotor 2 of the motor has a low resistance winding, having three phases 20, 21 and 22, also connected in star.

A 3-phase rectifier 11, having three anodes, 14, 15, and 16, and an incandescent cathode 12, is supplied with low alternating voltage from the stator winding 1. For this purpose the three phases of the stator winding 1 are provided with low voltage taps 17, 18 and 19, which are connected, preferably through suitable resistance, to the anodes 14, 15, and 16 respectively. A secondary winding 13 is coupled to one of the stator phases and connected with its two ends to the incandescent cathode 12.

The mid-point of the winding 13 is connected to the rotor 2, whereby preferably the free ends of two phases, for instance of 20 and 21 are connected to the mid-point of winding 13 and the third phase 22 is connected in series with the parallel connected phases 20 and 21. The free end of winding 22 is connected to the star point of the stator winding 1.

With such arrangement alternating currents of proper value are supplied to the rectifier and these currents are rectified and fed through the rotor and back through the stator, the circuit for one anode of the rectifier being as follows: from point 17 of the stator winding 1 to anode 14, cathode 12, mid-point of winding 13, through parallel branches of rotor windings 20 and 21, through rotor winding 22 to the star point of stator winding 1 back to point 17. It should be noted that the direct current flowing through the rotor winding also passes the stator.

What I claim is:

1. An electric installation comprising an asynchronous motor, a gas-filled thermionic rectifier having at least one anode and an incandescent cathode, for supplying the rotor of said motor with direct current, and means for supplying the electrodes of said rectifier with low tension alternating current, said means comprising a part of the windings of the stator, connections between the anodes of the tube and tappings on the said winding, a separate low tension winding on the stator core, and connections between the last-mentioned winding and the cathode.

2. An electric installation comprising a source of alternating current, a motor having a stator comprising a core and a winding, said stator winding being connected to said source, said motor having a low resistance rotor winding, a gas-filled hot cathode rectifier, having a cathode and at least one anode, said rectifier being in series connection with said rotor winding and part of said stator winding, to supply direct current to said rotor winding and a separate low tension winding on the stator core for the heating of the cathode of said rectifier.

3. An electric installation comprising an asynchronous motor having a rotor and a stator, said stator having a core and a three-phase winding, a gas-filled thermionic rectifier to supply the rotor with direct current and having three anodes and an incandescent cathode, and means to supply said rectifier with a low-voltage alternating current comprising taps on each of said stator windings, each tap being connected to one of the anodes, and a separate low-voltage winding on the stator core to supply the heating current for said rectifier cathode.

PIETER HENDRIK ABRAHAM van LIS.